A. L. JONES.
PLANTER.
APPLICATION FILED MAR. 17, 1916.
1,212,067.
Patented Jan. 9, 1917.
2 SHEETS—SHEET 2.
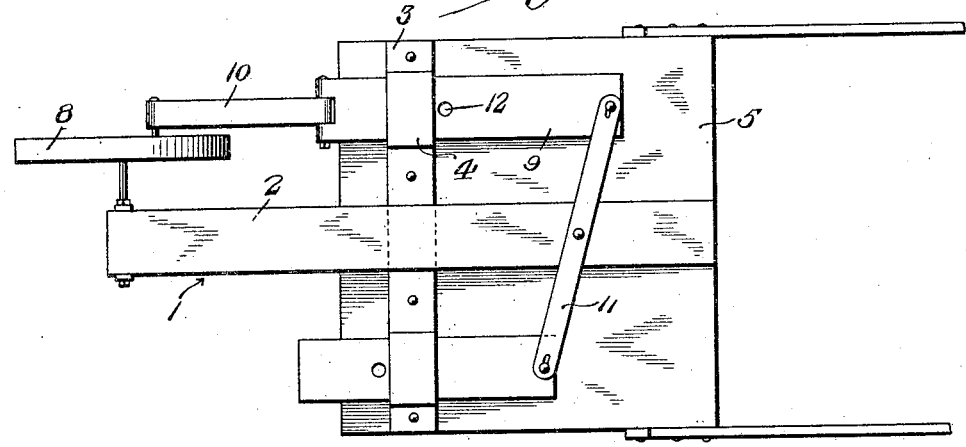
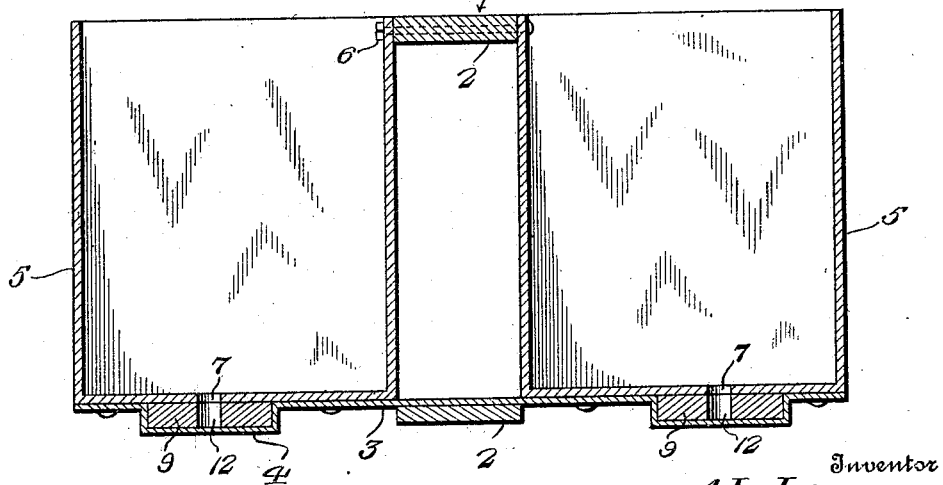
Witnesses
J. W. Crawford
L. C. Wilcox
Inventor
A. L. Jones,
By Victor J. Evans
Attorney

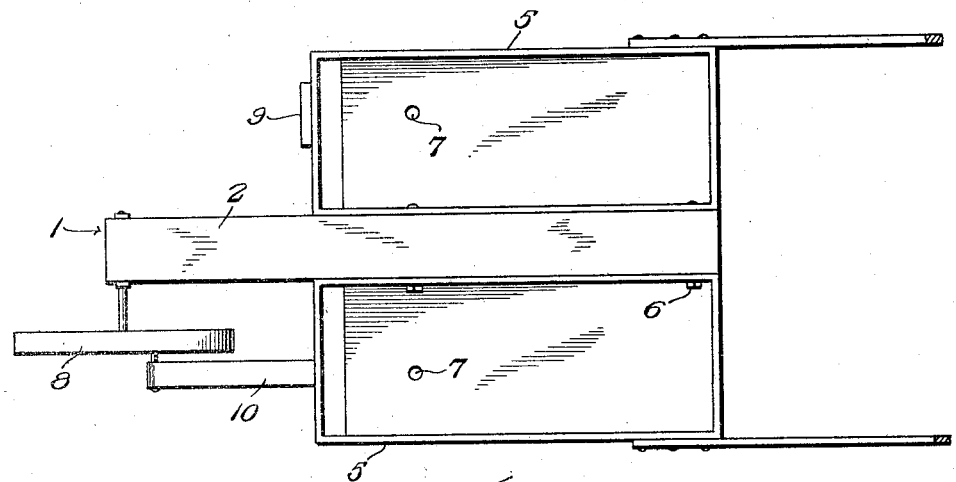
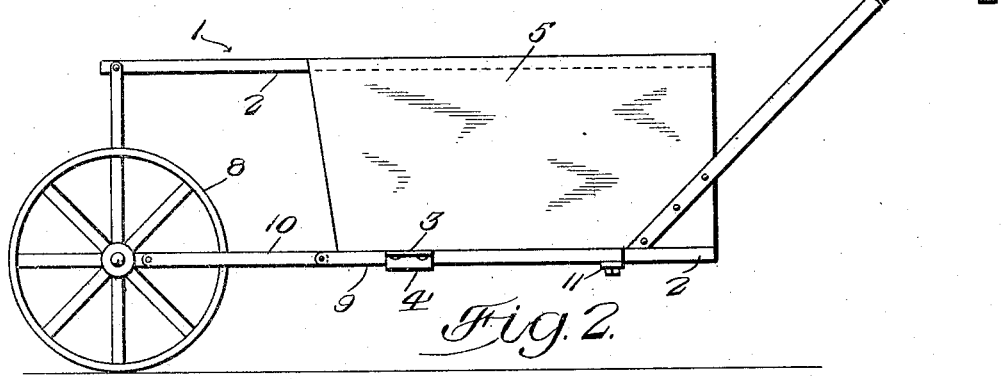
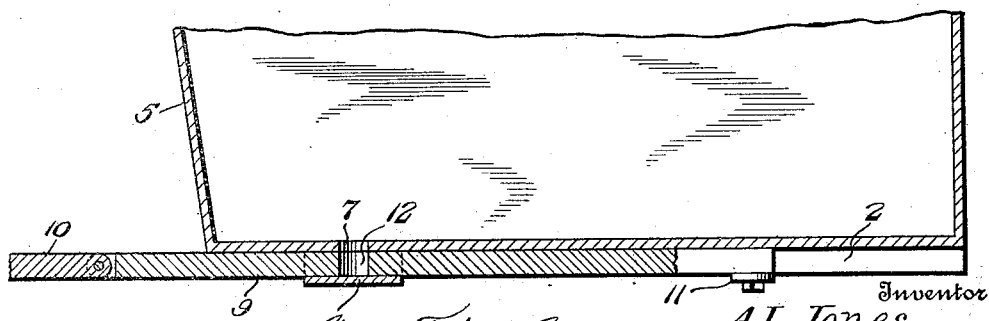

UNITED STATES PATENT OFFICE.

ANTHONY L. JONES, OF COLUMBIA, SOUTH CAROLINA.

PLANTER.

1,212,067.

Specification of Letters Patent.

Patented Jan. 9, 1917.

Application filed March 17, 1916. Serial No. 84,893.

*To all whom it may concern:*

Be it known that I, ANTHONY L. JONES, a citizen of the United States, residing at Columbia, in the county of Richland and State of South Carolina, have invented new and useful Improvements in Planters, of which the following is a specification.

This invention relates to planters and it consists in the novel features hereinafter described and claimed.

An object of the invention is to provide a planter especially adapted to be used for dropping seed of the character of peas and the like and with this object in view the planter comprises a plurality of hoppers each provided at its bottom with an opening. A guide is mounted at the bottom of each hopper below the opening thereof and a slide bar is mounted for reciprocatory movement in each of the said guides. The said slide bars are provided with openings which are adapted at times to register with the openings in the bottoms of the hoppers. Means are provided for simultaneously reciprocating the said slide bars in opposite directions. As the said slide bars move back and forth in the guides the seed from the hopper passes through the openings thereof and enter the openings in the said slide bars and when the said slide bars move to such an extent that their openings are carried beyond the edges of the guides the said seed is permitted to fall to the ground.

As illustrated in the accompanying drawings:—Figure 1 is a top plan view of the planter. Fig. 2 is a side elevation of the same. Fig. 3 is a bottom plan view of the same. Fig. 4 is a longitudinal sectional view thereof and Fig. 5 is a transverse sectional view thereof.

The planter comprises a frame 1 which may be composed of wood or any other suitable material and which includes upper and lower beams 2. A cross bar 3 is mounted upon the lowermost beam and the said cross bar is provided in the vicinity of its ends with depressed guide portions 4. Hoppers 5 are mounted at their forward portions upon the cross bar 3 and the said hoppers are secured at their inner sides to the uppermost beam 2 by means of bolts 6 or other suitable securing devices. The hoppers 5 are provided at their bottoms with openings 7 which are located above the intermediate portions of the guides 4 provided upon the cross bar 3.

A ground wheel 8 is journaled for rotation upon the lowermost beam 2 and slide bars 9 are mounted for longitudinal movement within the guide portions 4 of the cross bar 3. A pitman rod 10 is pivotally connected at one end with the forward end of one of the slide bars 9 and is pivotally connected at its other end with the wheel 8 at a point eccentric thereof. A lever 11 is fulcrumed upon the lowermost beam 2 and the opposite ends of the said lever are pivotally connected with the rear end portions of the slide bars 9. Each slide bar 9 is provided with an opening 12 and as the said slide bars reciprocate back and forth in the guide portions 4 the openings 12 may be brought into register with the openings 7 at the bottoms of the hoppers 5 and during the longitudinal movement of the slide bars 9 the openings 12 therein are carried beyond the edges of the guide portions 4 of the cross bar 3. It will be observed that the lever 11 is connected with the slide bars 9 in a manner to cause them to reciprocate simultaneously in opposite directions.

The seed to be planted is carried in the hoppers 5 and as the slide bars 9 move and their openings 12 come in register with the openings 7 in the bottoms of the hoppers the seed falls from the hoppers into the openings 12 and is carried along the upper surface of the guide portions 4 of the cross bar 3. When the openings 12 pass beyond the edges of the guide portions 4 of the cross bar 3, the seed which has been carried in the said openings gravitates to the ground and hence the planting operation is attained.

From the foregoing description taken in conjunction with the accompanying drawing it will be seen that a planter of simple and durable structure is provided and that the parts mutually coöperate with each other to effect the separation of the seed and the precipitation of the same in a regular and uniform manner.

Having described the invention what is claimed is:—

A planter comprising a frame, a cross bar mounted on the frame and having depressed guides located at the opposite sides of the frame, hoppers mounted on the cross bar and provided at their bottoms with openings located above said depressed guides and opposite closed portions thereof, a wheel journaled to the frame, slide bars movably mounted in the depressed guide portions of the cross bars and having openings adapted to be brought into register with the openings in the bottom of the hoppers and adapted to be moved beyond the edges of the depressed guide portions, a pitman rod pivotally connected with one of the slide bars and eccentrically connected with the guide wheel and a lever fulcrumed upon the frame and pivotally connected with both of the said slide bars.

In testimony whereof I affix my signature in presence of two witnesses.

ANTHONY L. JONES.

Witnesses:
C. M. GRAHAM,
L. BRENT ALLEN.

Copies of this patent may be obtained for five cents each, by addressing the "Commissioner of Patents, Washington, D. C."